United States Patent Office 2,823,002
Patented Feb. 11, 1958

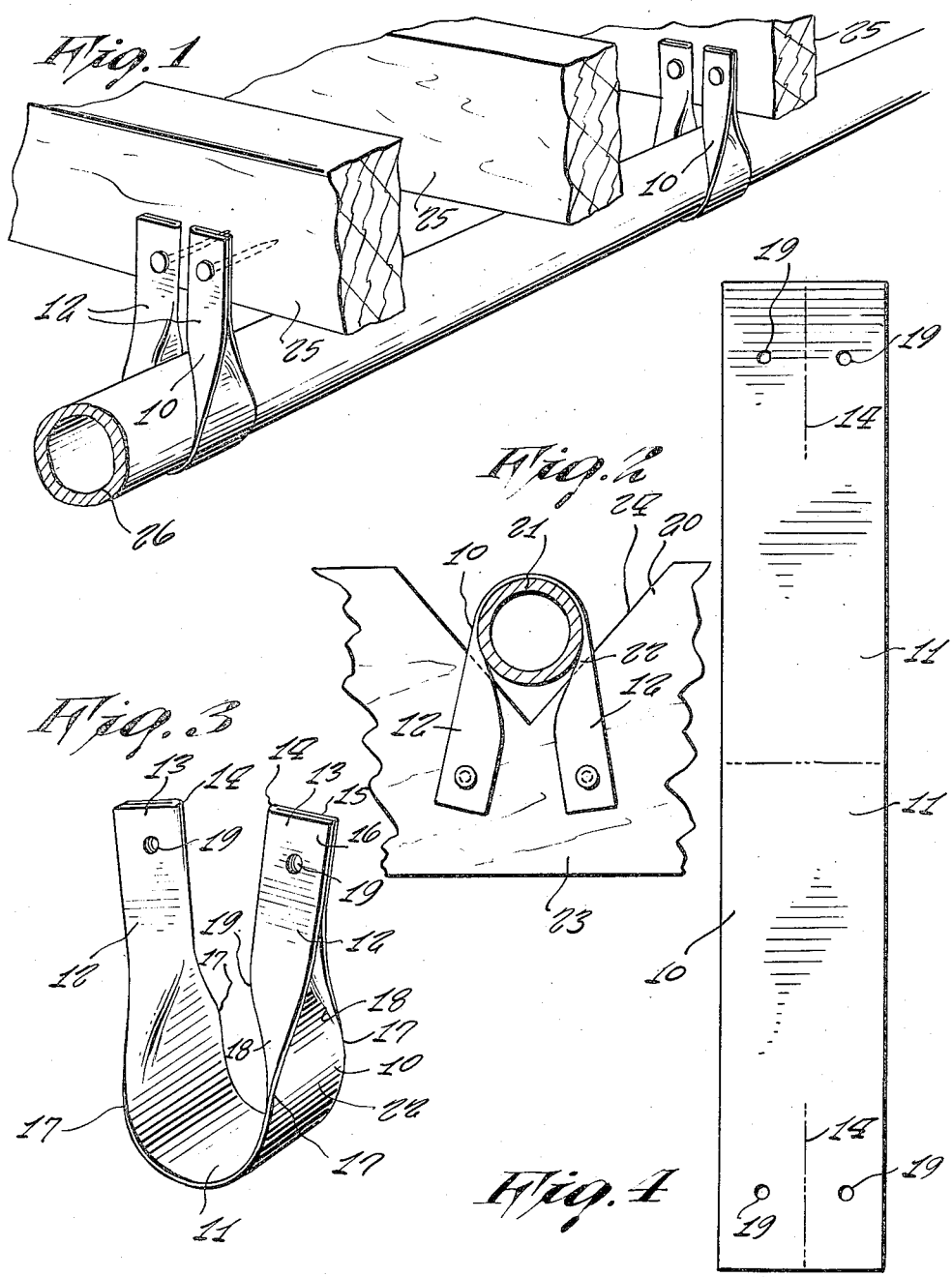

2,823,002

PIPE HANGER

Harold Savitz, Easton, Pa.

Application March 22, 1954, Serial No. 417,660

1 Claim. (Cl. 248—65)

This invention relates to supports for relatively light piping such as copper tubing which is installed in notched timber construction. However, the application of the instant device to other environments is within the inventive scope.

In the conventional installation, the tubing is generally affixed to the floor or partition construction with makeshift devices such as nails, metallic straps, hooks, etc. These devices do not generally effect a secure and firm connection and allow the tubing to contact the timber when pressure is exerted against the tubing. Thus when fluid flow takes place in the tubing, the tubing vibrates against the surrounding timber structure, causing objectionable noises and wear and tear on the tubing.

The instant device offers a solution to these problems, in that the tubing is securely mounted on a resilient support which permits a predetermined amount of deflection from internal or external forces. The tubing is so suspended or supported that the usual deflection causing forces will not cause the tubing to contact the surrounding floor or partition structure.

Consequently, the broad object of this invention is to provide a resilient means for supporting lightweight piping or tubing whereby the supporting means prevents the tubing from contacting the surrounding structures such as floors or partitions.

More specifically, the inventive object is the provision of a resilient band adapted to suspend or support tubing or piping, the band being formed of a homogeneous, continuous resilient material, and having means for firm attachment to floors, ceilings, partitions or the like.

Further objects and construction details will be apparent from the following description and drawings in which:

Figure 1 depicts the piping support affixed to a supporting structure such as joists, and carrying the tubing or piping.

Figure 2 is a transverse section showing the support in position relative to a notched floor member.

Figure 3 is a perspective view of the support.

Figure 4 is a developed plan view of the support material prior to the formation of the finished shape.

Referring to the drawings, the piping support 10 (Figure 3) is comprised of a band of resilient material such as copper, sheet metal, plastic, etc., having a curvilinear portion 11, and extending tangentially away from the curved portion to form the legs 12. The legs 12 are shaped to form the transverse portions 13 by bending the legs about their centerlines 14 until the two leaves 15 and 16 are normal to the axis of the curved portion 11. It is to be noted that the material of the legs which is bent to form the transverse leaves 15 and 16, starts near the points of tangency 17. The bending lines 18 then continue diagonally to a point of intersection 19 located along the centerline 14, at which point the two leaves 15 and 16 proceed parallel to the ends of the legs. By crimping along the bending lines, the two leaves form sturdy two-ply supporting legs. Perforations 19 are provided near the ends of the legs for securing purposes.

Referring to Figure 2, the support 10 is shown in operative position relative to an underlying notched timber 20. The tubing or piping 21 is gripped firmly by the curved portion of the support. It is to be further noted that due to the bend lines 18 originating at the tangent point 17, a central portion of the band 22 continues as a curve directed towards the axis of the curved portion 11. Thus the tubing 21 is enveloped over an extent greater than half its circumference providing vertical support at points 22. The legs 12 abut the side of the structural member in parallel fashion whereby the support can be firmly attached. Due to the legs 12 being upstanding the pipe 21 is held above the member 23 whereby contact between the tubing and 23 is precluded. Since the portion of the band 22 is wider than the legs 12, a portion of the wide section will extend over the taper edges 24, giving added support to the tubing.

In Figure 1, the support 10 is attached to the beams 25 and the tubing 26 is carried beneath as shown. Again we see that the tubing is separated from the beams 25 by means of the legs 12.

In Figure 4, the material from which the support 10 is shaped is depicted. It is apparent that a rectangular strip can be used. Thus by the simple process of bending as outlined above, a sturdy resilient support is formed.

The various modifications attainable by changes in shape, size or material, are all contemplated within the inventive scope.

Having thus set forth and disclosed the nature of my invention, what is claimed is:

A pipe hanger comprising a resilient strip of material folded longitudinally along the ends thereof to form a pair of end portions of double thickness and half the width of said strip, both of said portions lying in a common plane, the intermediate portion of said strips merging into said end portions and having upper and lower surfaces extending perpendicularly relative to said end portions, said intermediate portion defining an arcuate base for supporting a pipe, said merging of said intermediate portion of said strip with said end portions defining a pair of outwardly and oppositely facing pockets, whereby said hanger is flexible in the directions of said plane and substantially rigid in a direction transversely thereof.

References Cited in the file of this patent

UNITED STATES PATENTS

| | | |
|---|---|---|
| 889,395 | Noyes | June 2, 1908 |
| 1,085,421 | Hiller | Jan. 27, 1914 |
| 1,131,867 | Pyle | Mar. 16, 1915 |
| 1,329,268 | Dickelmann et al. | Jan. 27, 1920 |
| 1,515,216 | Kissinger | Nov. 11, 1924 |